US011749071B2

(12) United States Patent
Crooks et al.

(10) Patent No.: US 11,749,071 B2
(45) Date of Patent: Sep. 5, 2023

(54) SELF-CONTAINED SCANNER CONFIGURATION

(71) Applicant: NCR Corporation, Atlanta, GA (US)

(72) Inventors: John Crooks, Duluth, GA (US); Steve Pixton, Douglasville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/231,130

(22) Filed: Dec. 21, 2018

(65) Prior Publication Data

US 2020/0202682 A1 Jun. 25, 2020

(51) Int. Cl.
*G07G 1/00* (2006.01)
*G06F 9/445* (2018.01)
*G06K 7/10* (2006.01)
*G07G 1/12* (2006.01)

(52) U.S. Cl.
CPC ....... *G07G 1/0009* (2013.01); *G06F 9/44505* (2013.01); *G06K 7/1096* (2013.01); *G06K 7/10861* (2013.01); *G07G 1/0054* (2013.01); *G07G 1/12* (2013.01)

(58) Field of Classification Search
CPC .............. G07G 1/0009; G07G 1/0054; G07G 9/44505; G07G 1/12; G06K 7/10861; G06K 7/1096; G06Q 20/202; G06Q 20/204; G06Q 20/208; G06Q 20/20
USPC .................. 235/375–385, 435, 439, 454, 462
See application file for complete search history.

(56) References Cited

U.S. PATENT DOCUMENTS

| | | | | |
|---|---|---|---|---|
| 5,675,755 A | * | 10/1997 | Trueblood | G06F 3/0481 715/791 |
| 5,992,570 A | * | 11/1999 | Walter | G07G 3/003 186/36 |
| 9,569,938 B1 | * | 2/2017 | Lampe | G07G 1/0018 |
| 10,339,515 B1 | * | 7/2019 | Johnson | B62B 3/1444 |
| 2004/0215627 A1 | * | 10/2004 | Whalen | H04L 41/0893 |
| 2007/0069030 A1 | * | 3/2007 | Sauerwein, Jr. | G06K 7/0004 235/462.46 |
| 2012/0297316 A1 | * | 11/2012 | Ercegovic | G06Q 10/107 715/752 |
| 2013/0024371 A1 | * | 1/2013 | Hariramani | G06Q 20/384 705/41 |
| 2013/0031623 A1 | * | 1/2013 | Sanders | G06F 21/36 726/19 |
| 2014/0166760 A1 | * | 6/2014 | Meier | G06K 7/10544 235/470 |
| 2015/0077326 A1 | * | 3/2015 | Kramer | G06F 3/0325 345/156 |

(Continued)

*Primary Examiner* — Matthew Mikels
(74) *Attorney, Agent, or Firm* — Schwegman Lundberg & Woessner, P.A.

(57) ABSTRACT

Scanner/scale configuration is performed without scanning a series of programming barcodes and performed when a terminal is in a transaction processing mode of operation. A single code scanned into the scanner, initiates a configuration tool on the terminal and causes a graphical user interface (GUI) window to be rendered on a display of the terminal on top of any transaction windows rendered on the display. The GUI window permits user-defined configuration of the scanner/scale. In an embodiment, the configuration tool also provides a clone code that represents a source scanner/scale's configuration settings, when the clone code is scanned into a target scanner, the source scanner/scale's configuration settings are cloned on the target scanner/scale.

7 Claims, 5 Drawing Sheets

(56) References Cited

U.S. PATENT DOCUMENTS

2019/0098153 A1* 3/2019 Hayashi ............. H04N 1/00949

* cited by examiner

SELF-CONTAINED SCANNER CONFIGURATION

BACKGROUND

The number one cause of scanner/scale support escalations is questions about configuration—what configuration to use, and how to apply it. Scanner/scales must be custom-configured to match each retailer's Point-Of-Sale (POS) hardware, application software, platform software, and store business rules.

Legacy scanner/scales can be configured by one of several methods. The most common method is to scan a long sequence of programming tags. Another method is to create a "gold image" scanner/scale configuration file extracted from a known-good primary scanner/scale, and to inject the gold image file into other secondary scanner/scales via a Universal Serial Bus (USB) Flash drive or an Ethernet Trivial File Transfer Protocol (TFTP) server. These methods confuse system integrators, sales people, service engineers, and pre-sales support teams due to their complexity.

Some retailers lock down their POS systems so field service personnel cannot access any diagnostic tools through the POS Operating System (OS) desktop.

SUMMARY

In various embodiments, methods and terminal for self-contained scanner configuration are presented.

According to an embodiment, a method for self-contained scanner configuration is presented. A code that is scanned into a scanner of a terminal is received. The code is identified as a request to initiate a scanner/scale configuration tool, and the scanner/scale configuration tool is automatically initiated on the terminal. The scanner/scale configuration tool, once initiated, renders a Graphical User Interface (GUI) within a window on a display of the terminal for configuring an integrated scanner/scale of the terminal.

DETAILED DESCRIPTION

Figure 1:
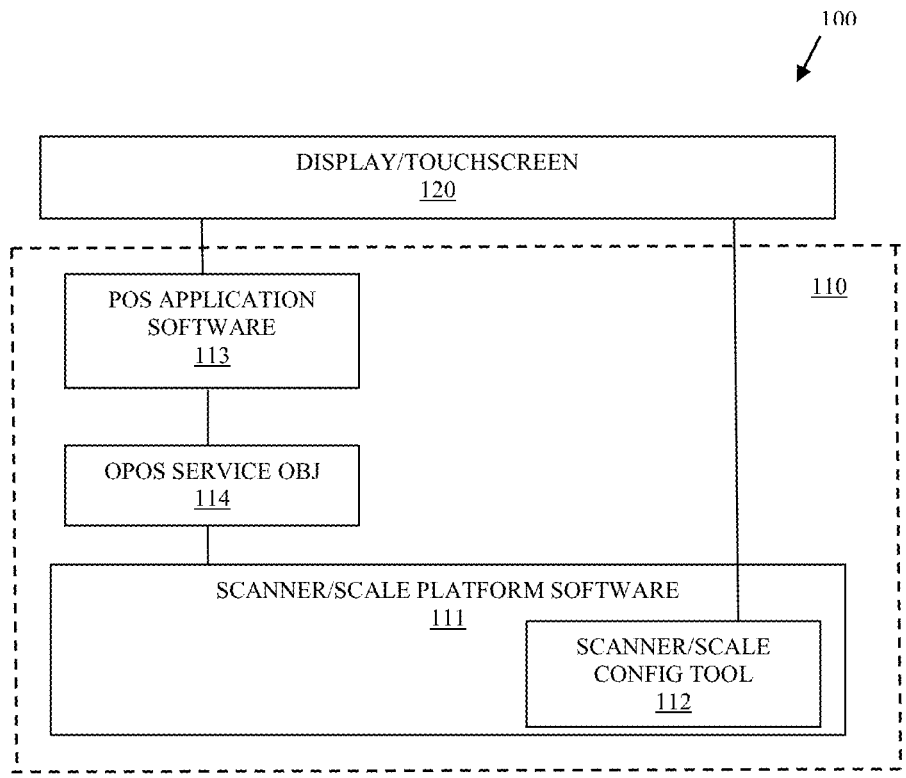
FIG. 1 is a diagram of an architecture for self-contained scanner configuration, according to an example embodiment.

FIG. 1 is a diagram of an architecture 100 for a self-contained scanner configuration, according to an example embodiment. It is to be noted that the architecture 100 is presented in greatly simplified form with just those elements necessary for comprehending the various embodiments presented herein shown. Other architectures with more or less elements and arranged differently may be used without departing from the teachings herein relevant to self-contained scanner configuration.

It is to be noted that the term "POS terminal" as used herein can include a cashier-operated/assisted terminal device or a Self-Service Terminal (SST) operated by a customer. A mode of operation between cashier-assisted and self-service can make the POS terminal operate as a cashier-assisted terminal or a SST for transaction processing. A POS terminal may also be used synonymously with the phrase "transaction terminal," herein and below.

Furthermore, the terms and phrases: "customer," "consumer," "user," "service engineer," "technician," and "operator" may be used interchangeably and synonymously herein and is intended to mean the individual operating the transaction terminal at any given point in time for purposes of conducting a consumer transaction and/or providing support services to the transaction terminal.

The architecture 100 includes a motherboard 110 having one or more processors, memory (volatile and non-volatile), a non-transitory computer-readable storage medium, peripheral device drivers for attached peripherals, and peripheral ports for attaching the peripherals. Built into the motherboard 110 is scanner cameras and illumination devices 1, scale/weigh plate devices, and a speaker.

That is, the motherboard 110 represents a composite device supporting at least three independent but integrated devices: a transaction terminal, a scanner, and a scale.

The non-transitory computer-readable storage medium of the motherboard 110 includes executable instructions that are executed by the one or more processors. The executable instructions are represented as the scanner/scale platform software 111, the scanner/scale configuration tool 112, the POS application software 113, and the Object Online Linking (OLE) for POS (OPOS) service object 114.

The scanner/scale platform software 111, the scanner/scale configuration tool 112, the POS application software 113, and the OPOS service object 114 process within a same Operating System (OS) that executes on the one or more processors of the motherboard 110. The scanner/scale platform software 111 runs at a higher priority within the OS than the POS application software 113.

Conventionally, existing scanner/scale configuration techniques are laborious and fraught with problems. This frustrate users and makes them doubt any particular vendor's ability to deliver a fully integrated system solution.

Such issues are addressed herein with the architecture 100 and the techniques discussed herein and below. As will be more completely demonstrated below, complicated and laborious scanning of configuration program tags is replaced a novel scanner/scale configuration tool 112 that is processed within the OS processing context of the scanner/scale platform software 111 and is projected on top of or above a processing-context within the OS that processes the POS application software 113 software. Users launch the tool 112 by retrieving a launcher barcode from a variety of sources including a predefined service website. Private launcher barcodes are provided to enable protected (available only to authorized service personnel) tool 112 functionality. Moreover, users clone scanner/scale settings using a smart phone without any special applications (apps) or tools.

The techniques presented herein are performed for configuring a scanner of the motherboard 110 without any scanning of programming tags being required by the scanner. The information needed by the scanner from these programming tags is replaced with the scanner/scale configuration tool 112 that is built into the scanner/scale platform software 111, and processes at a higher-priority level within the OS than the POS application software 113. The higher-priority level of the scanner/scale platform software 111 permits the tool 112 to be projected above the windows/screens generated by and the processing of the POS application software 113 within the motherboard 110.

Furthermore, a technique to launch the tool 112 is achieved through a special tool launcher barcode obtained from a predefined support website. There may be a variety of special launcher barcodes available from the support website for varying levels or degrees of user privileges to access configuration features of the scanner/scale.

Additionally, a technique is provided to clone scanner/scale settings from a source scanner/scale to a target scanner/scale using an unprepared mobile device of the user (unprepared in that the mobile device needs no special software to perform the technique). The tool 112 provides (displays or other mechanisms to provide) a 2 dimensional (2D) barcode as a "gold configuration" or model for the source scanner/scale configuration. The user (installer) takes a picture of the gold configuration barcode. The scanned picture is then scanned at the target scanner and the target scanner configures itself with the gold configuration.

As will be demonstrated herein and below, the technique provide: a projected tool 112 that is projected on top of any POS generated windows by the POS application software 113, the tool replacing a need to scan legacy barcodes to perform scanner/scale configuration; a website obtained barcode scanned at the scanner/scale launches the tool 112; depending on the barcode obtained from the website, the tool is launched at different privilege levels; and an unprepared smart and mobile device (such as a phone) can be used to clone a source scanner/scale on a target scanner/scale.

In a first aspect, the programming tags that are required to be scanned to configure a scanner/scale are removed, such that no programming tags are needed for configuring the scanner/scale. The actions performed by scanning of programming tags are replaced with the tool 112 that is processing within a same OS from processors of a same motherboard 110 as the POS application software 113. However, the tool 112 is processing within a context of the scanner/scale platform software 111 and is assigned a higher-OS priority than processes/windows performed or rendered by the POS application software 113.

This arrangement of 111, 112, and 113 within the OS and on the motherboard 110 (having an integrated scanner/scale) permits the tool 112 to access the attached POS display 120 (the display may or may not be touch-enabled (touchscreen) display 120 or a non-touch enabled display 120). Therefore, windows rendered by the tool 112 can be placed on top of or always on top of any windows rendered by the POS application software 113 on the display 120. The "always-on-top" priority of windows rendered by the tool 112 can be achieved through OS settings and based on the tool 112 having a higher priority than any process of the POS application software 113.

The scanner/scale platform software 111 includes a built-in barcode engine that is always resident in memory and capable of being processed by the processors of the motherboard 110 as long as the scanner hardware is operational, which it is as long as the motherboard 110 is powered on. Scanner functionality is not available when the barcode engine is not resident in memory for processing. This ensures that the tool 112 is always available for launching on the motherboard 110.

Once the architecture 100 is arranged, such that the tool 112 is always available as long as the scanner is operational (which it would be if the motherboard 110 is powered on unless there was some hardware malfunction of the motherboard 110), and the tool 112 rendered windows are assured of being always on top based on the OS priorities and OS settings (as discussed above), the tool 112 is launched when a scanner/scale is in need of configuration (new configuration or modified existing configuration).

In an embodiment, launching the tool 112 on the motherboard 110 proceeds as follows: a user/installer retrieves a scanner support website managed barcode. The barcode is scanned on the scanner of the motherboard 110. The barcode engine of the scanner/scale platform software 111 recognizes the barcode that was scanned and launches the tool 112 within a window rendered on the display 120 and on top of any POS-generated windows appearing on the display 120. Retailers where the terminal associated with the motherboard 110 are deployed, often restrict access to the scanner configuration using the OS controls of the motherboard 110, such restricted access can be and is circumvented herein with the architecture 100. However, security is enhanced such that there is little concern of a casual user inadvertently launching the scanner's configuration, because the website that manages the launching of the scanner tool 112 requires a log in by the user and based on security settings associated with the user's log in an appropriate launch barcode is rendered on a display of the device that the login occurred from and because the barcodes are configured to the user's assigned security permissions or access levels.

The tool 112 is launched with custom security settings, such settings (applied by the scanner/scale software platform 111) may disable features of the tool 112 prior to launch (when the user that launched the tool 112 obtained a barcode based on the user's known security permissions, which lacked access to those disabled features). Thus, only those features/functions available to the user that scanned the barcode on the scanner are active in the launched tool 112.

In an embodiment, the scanner/scale platform software 111 only permits the launching of the tool 112 when the scanner/scale is powered on (motherboard 111 powered on). In this embodiment, when the barcode engine sees the barcode for launch, the scanner/scale platform software 111 blocks and does not launch the tool 112. This embodiment prevents cashiers and self-checkout customers from accidentally launching the tool 112.

In an embodiment, the scanner/scale platform software 111 enforces a policy for the scanner/scale, the terminal (motherboard 110), an enterprise associated with the terminal, and/or a user providing the barcode to determine whether the tool 112 is to be launched or not based on whether the policy is satisfied.

In an embodiment, a user/installer, through operation of a smart phone (could be any wearable processing device) with an appropriate application (app) and an integrated camera, scans a Hyper Text Markup Language (HTML) or Quick Response (QR) coded sticker attached to the scanner/scale chassis of the scanner/scale. For example, iPhones® with iOS® 11 and higher have an HTML QR code reader integrated into their camera. The HTML or QR code directs the user's smart phone web browser to a service public support website for scanners.

On the service public support website, the user touches a web browser button in a webpage interface for an option to "Configure Your Scanner," which displays the tool 112 launcher barcode. In an embodiment, the tool 112 launcher barcode is preferably Datamatrix® data encoded format that includes unique data content recognized by the scanner/scale platform software 111 and/or the tool 112. Optionally, the support website offers other launcher barcodes that enable higher levels of user privilege. Higher level launcher barcodes might require the user to enter a password into the support website to display them. Optionally, the support website requires a log in from a user for any access to the website, as discussed above. The user-assigned privileges determine a security level embedded in the QR code, and the security level determines which features/functions are enabled and disabled when the tool 112 is launched on the motherboard 110 for execution.

After having acquired the barcode on the user/installer's mobile device, the user/installer presents it to the scanner of the motherboard 110. The barcode engine recognizes the barcode and the scanner/scale platform software 111 launches the tool 112 with the appropriate features turned on (activated) or off (disabled) based on security permissions encoded in the barcode.

In an embodiment, the barcode that launches the tool 112 can come from one or more of the following locations: printed in support guide for the scanner, printed in factory packaging for the terminal associated with the motherboard 110, email/text delivered to a mobile device of the user/installer after contacting a support desk (by text, email, or phone), printed to a bottom of the scale's top plate, printed and hidden on an inside portion of a housing for the scanner/scale where only support personnel know its location (for example, inside the scanner vertical tower cowl).

Alternatively, the barcode can be included in a service guide, which will only be available to field engineers through an employee-only internal employer website.

In an embodiment, the tool 112 can be launched with other techniques besides the tool 112 launcher barcode, such as: user presses a dedicated hardware control button on the scanner; user performs a special sequence of operations (for example starting the scanner/scale while holding down the scale zero button on the scale); and/or user logs into the POS application software 111 as an administrator and touches a "configure scanner" interface button within a POS application software-generated window (Graphical User Interface (GUI))—the POS application software 113 then sends a special command to the scanner/scale platform software 111, which causes the scanner/scale platform software 111 to launch the tool 112 (not in this embodiment changes are needed to the POS application software 113 to support collection of and delivery of the special command).

It is also to be noted that launching the tool 112 can be achieved through any of, some combination of, or all of the above-mentioned techniques (barcode and non-barcode techniques), such that each available technique is not mutually exclusive of other remaining launch techniques.

Furthermore, and an in an embodiment, the POS application software 113 does not need to be integrated with the tool 112; that is there are no changes needed to the POS application software 113 to launch the tool 112.

Figure 2:
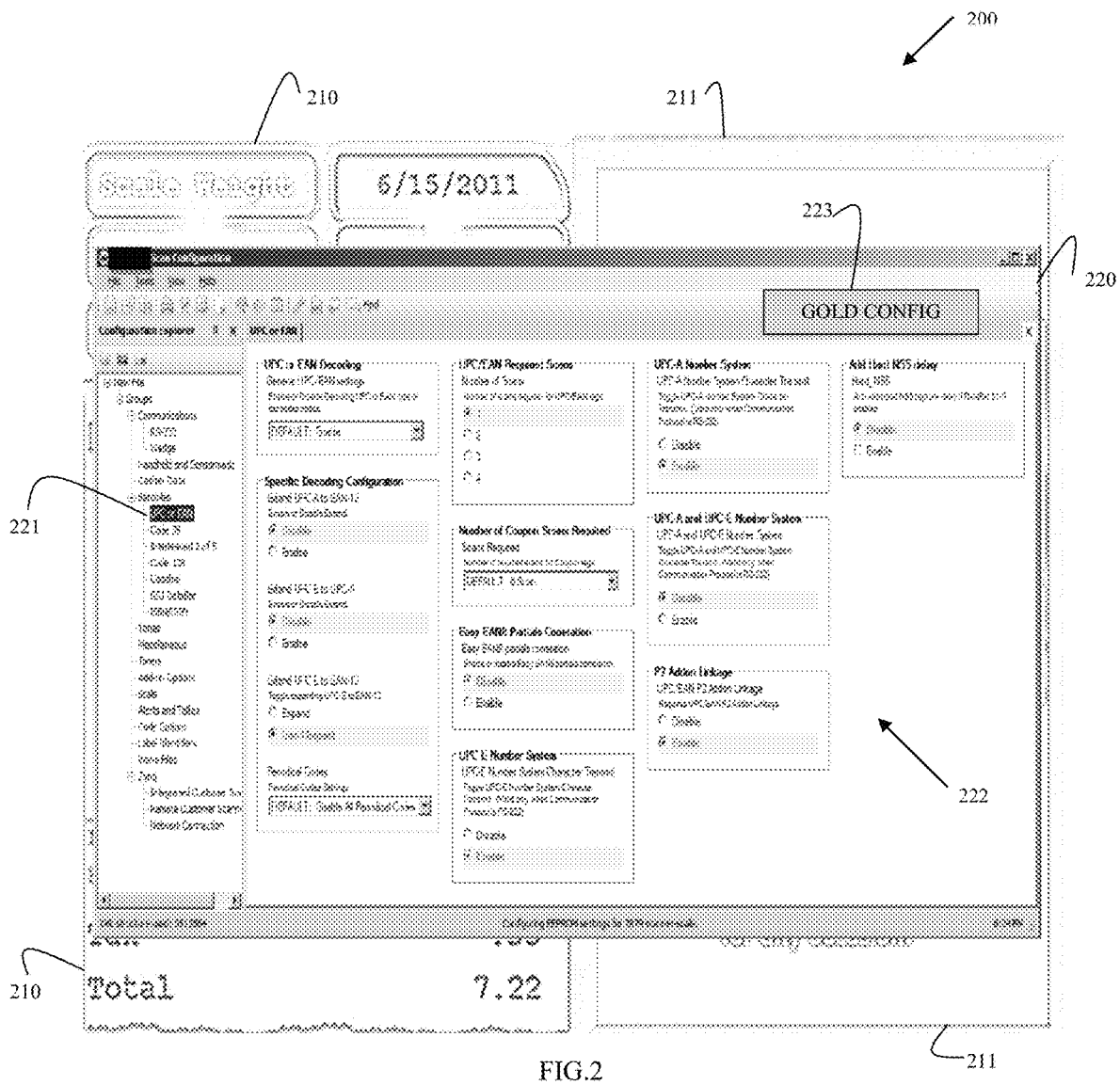
FIG. 2 is a diagram an example screen rendered on a POS display for self-contained scanner configuration, according to an example embodiment.

Once the tool 112 is launched successfully, a GUI window is rendered on the display 120. A sample configuration GUI window for the tool 112 is shown in the FIG. 2. Windows 210 and 211 are generated during transaction processing by the POS application software 113, the window 220 is generated by the tool 112 and is at a higher-priority such that is it on always top of the windows 210 and 211. The available options 222 for configuration are based on a selection 221 made within the tool 112.

All aspects of the scanner and the scale that are integrated into the motherboard 110 can be configured from the tool 112, such as and by way of example only, scale calibration and diagnostic functions. If the tool 112 was brought up based on user-security level, some available options 222 may be missing from the window 220 or may be present but greyed out such that the user is unable to access such options 222. Lower level priorities (security or access level) may include options 222 for: enabling barcode symbologies, adjusting default feedback audio beep volume and tone settings, adjust same-item item, dump scanner/scale logs to a Universal Serial Bus (USB) flash drive, view scale calibration information (date calibrated/number of times calibrated/scale software version number), etc. Higher level priorities (security or access level) may include options 222 for changing the scanner/scale serial number, initiating scale calibration, changing scale filtering, selecting pound/kilogram units, etc.

The user can then simply select the save button option within the GUI window 220 and the tool 112 and/or scanner/scale platform software 111 performs the configuration on the scanner/scale componentry and drivers of the scanner/scale in accordance with the changed options 222 made by the user through the GUI window 220 of the tool 112. The user then selects an exit option and the tool-generated GUI window 220 is removed from the display 120.

In still another aspect, a source scanner/scale can be cloned (configuration is cloned) to a target scanner/scale. This duplicates scanner/scale configuration settings from the source scanner/scale to a target scanner/scale without any USB flash drives, printed program tags, extra hardware devices, such as a laptop, etc.

Here, the scanner/scale configuration tool 112 on a primary/source scanner/scale briefly displays one or more 2D barcodes encoded with the primary scanner's gold configuration. An installer/user with an unprepared smart phone (or wearable processing device with a camera) takes a picture of the gold barcode from the display 120 of the source, and then that gold barcode image is presented to a second/target scanner/scale which reads and applies the gold configuration to the second/target scanner/scale using its tool 112 and/or scanner/scale platform software 111.

The process proceeds as follows: the user invokes the tool 112 in any of the manners discussed above on the source/primary terminal (motherboard 110) having the desired configuration for its integrated scanner/scale. The tool 112 is launched and presented in the GUI window 220 on the display 120 of the terminal. The user selects an option 223 from the GUI window to display the source scanner/scales gold configuration barcode(s). The user takes a picture of the gold configuration barcode using the user-operated mobile device. The user then displays that gold configuration barcode on the user-operated device's display and presents it to the scanner of the target/second scanner/scale. The instance of the scanner/scale platform software 111 on the source terminal having the integrated scanner/scale using its barcode reader recognizes the gold configuration barcode as a request to configure the target scanner/scale on the target terminal with the configuration settings for the components and drivers of the target scanner/scale and performs the configuration to duplicate the configuration settings of the source scanner/scale within or on the target scanner/scale. This process can be repeated as many times as the user desires with other target scanners/scales.

In an embodiment, the gold configuration barcode is a Datamatrix® symbology encoded with configuration information representing the configuration settings for resources of the source scanner/scale.

In some instances, the configuration settings for the source scanner/scale may be too large to fit into a single barcode, in such cases, the primary/source scanner/scale tool 112 may display multiple gold configuration barcodes one after another successively, with instructions presented within the GUI window 220 for the user to photograph each one separately from the others.

In an embodiment, the gold configuration barcode can optionally be printed on a paper receipt using the POS printer (attached peripheral to the source terminal (interfaced to the source motherboard 110).

In an embodiment, the source terminal provides a single gold configuration barcode on the display 120 as part of its boot up or start up sequence. Here, the user would reboot the source terminal (motherboard 110) wait for the configuration barcode or codes to be rendered on the display 120 and snap a picture at the appropriate time such barcode or codes are rendered on the display 120 during startup processing of the source terminal.

In an embodiment, a custom app on user smart phone reads the 2D barcode from the primary/source scanner/scale, and then generates a cleanly rendered duplicate of the 2D barcode. This optional technique can be used to improve the display quality of the barcode.

In cases having multiple gold configuration barcodes, the primary/source scanner encodes each gold configuration barcode with sequence information that tells the secondary/target scanner/scale how many gold configuration barcodes are required to re-assemble a complete configuration. The secondary/target scanner/scale platform software 111 prompts the user with messages to scan each gold configuration barcode in turn by projecting an always-on-top graphical user interface window over the POS application software 113 generated windows.

In an embodiment, the technique presented are implemented in a conventional architecture (separate motherboards for the POS terminal and the scanner/scale) utilizing an OPOS service object. Here, the scanner/scale is separate from the POS terminal, connected by USB or RS232. In this embodiment, the configuration tool 112 is part of the OPOS scanner/scale service object 114 which runs on the POS terminal. The OPOS scanner/scale service object 114 recognizes when a configuration tool launcher barcode is read, and launches the configuration tool 112 on the POS terminal when appropriate. The configuration tool 112 creates a gold image file that the OPOS scanner/scale service object 114 transfers to the scanner/scale over the USB or RS232 communication link.

These and other embodiments are now discussed with reference to the FIGS. 3-5.

Figure 3:
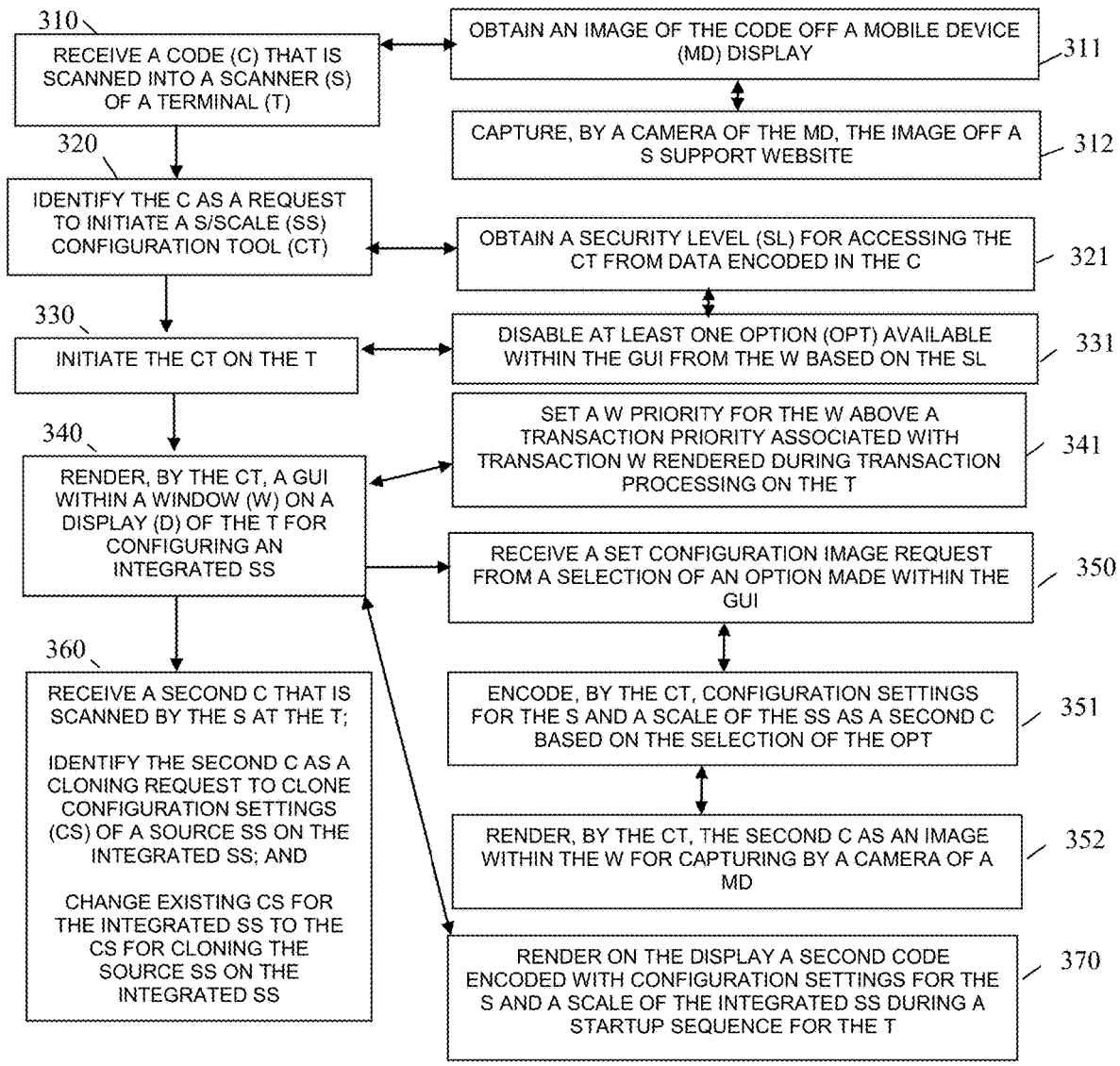
FIG. 3 is a diagram of a method for self-contained scanner configuration, according to an example embodiment.

FIG. 3 is a diagram of a method 300 for self-contained configuration of a scanner/scale, according to an example embodiment. The method 300 is implemented as executable instructions as a collection of software modules referred to collectively as a "scanner/scale configuration manager." The executable instructions reside in a non-transitory computer-readable storage medium and are executed from the non-transitory computer-readable storage medium by one or more processors of a transaction terminal. The transaction terminal has access to one or more networks during execution of the scanner/scale configuration manager by the processor. The networks can be wired, wireless, or a combination of both wired and wireless.

In an embodiment, the transaction terminal that executes the scanner/scale configuration manager is a combined integrated POS, scanner, and scale terminal represented by the motherboard 110 of the FIG. 1. In an embodiment, the transaction terminal is operated as a cashier assisted terminal for customer transactions. In an embodiment, the transaction terminal is operates as a SST by the customers that check themselves out for transactions.

In an embodiment, the transaction terminal is on a separate motherboard from the scanner/scale and the scanner/scale is connected to the transaction terminal though USB and/or RS232 cabling.

In an embodiment, the scanner/scale configuration manager is all of, or some combination of: the scanner platform software 111, the tool 112, and the OPOS service object 114.

The device that executes the scanner/scale configuration manager includes at least one primary display/touchscreen 120 interfaced to the device. In an embodiment, the display is a touchscreen. In an embodiment, the display is not touch enabled and at least one keyboard and/or mouse are also attached to the device that executes the scanner/scale human interface renderer when the display is not touch enabled.

At 310, the scanner/scale configuration manager receives a code that is scanned into a scanner of a terminal. In an embodiment, the terminal is the motherboard 110. In an embodiment, the code is a barcode. In an embodiment, the code is a QR code. In an embodiment, the code is a Datamatrix® formatted code.

In an embodiment, at 311, the scanner/scale configuration manager obtains an image of the code off a mobile device display for a mobile device operated by a user/support engineer.

In an embodiment of 311 and at 312, a camera of the mobile device captures the image off of scanner/scale support website.

In an embodiment, the code cab be obtained initially by the mobile device in any of the manners discussed above for the FIGS. 1 and 2.

At 320, the scanner/scale configuration manager identifies the code as a request to initiate a scanner/scale configuration tool. In an embodiment, the scanner/scale configuration tool is the tool 112.

In an embodiment, at 321, the scanner/scale configuration manager obtains a security level (access permissions) for accessing the scanner/scale configuration tool from data encoded in the code.

At 330, the scanner/scale configuration manager initiates the scanner/scale configuration tool on the terminal.

In an embodiment of 321 and 330, at 331, the scanner/scale configuration manager disables at least one option available within a GUI rendered in a window on a display of the terminal based on the security level.

At 340, the scanner/scale configuration tool, renders the GUI within the window on the display of the terminal for configuring an integrated scanner/scale.

In an embodiment, at 341, the scanner/scale configuration manager sets a window priority for the window above a transaction priority associated with transaction windows rendered during transaction processing on the terminal.

In an embodiment, at 350, the scanner/scale configuration manager receives a set configuration image request from a selection of an option made within the GUI. In an embodiment, the set configuration image request is the gold configuration barcode discussed above with the FIGS. 1-2 and the option selected is the option 222 of the FIG. 2.

In an embodiment of 350 and at 351, the scanner/scale configuration tool, encodes configuration settings for the scanner and the scale of the integrated scanner/scale as a second code based on the selection of the option. In an embodiment, the second code is a QR code or a Datamatrix® formatted code.

In an embodiment of 351 and at 352, the scanner/scale configuration tool renders the second code as an image within the window for capturing by a camera of a mobile device operated by the user/service engineer.

In an embodiment, at 360, the scanner/scale configuration manager receives a second code that is scanned by the scanner at the terminal. The scanner/scale configuration manager identifies the second code as a cloning request to clone configuration settings for a source scanner/scale on the integrated scanner/scale. The scanner/scale configuration manager changes existing configuration settings for the integrated scanner/scale to the configuration settings identified in the second code for cloning the source scanner/scale on the integrated scanner/scale.

In an embodiment, at 370, the scanner/scale configuration manager renders on the display of the terminal a second code encoded with all the configuration settings for the scanner and the scale of the integrated scanner/scale during a startup sequence for the terminal. That is, the gold configuration barcode for the integrated scanner/scale is rendered on the display during startup or boot processing of the terminal for capturing by a user/service engineer. This captured image can be used within a different terminal to clone the integrated scanner/scale on a different scanner/scale associated with the different terminal.

Figure 4:
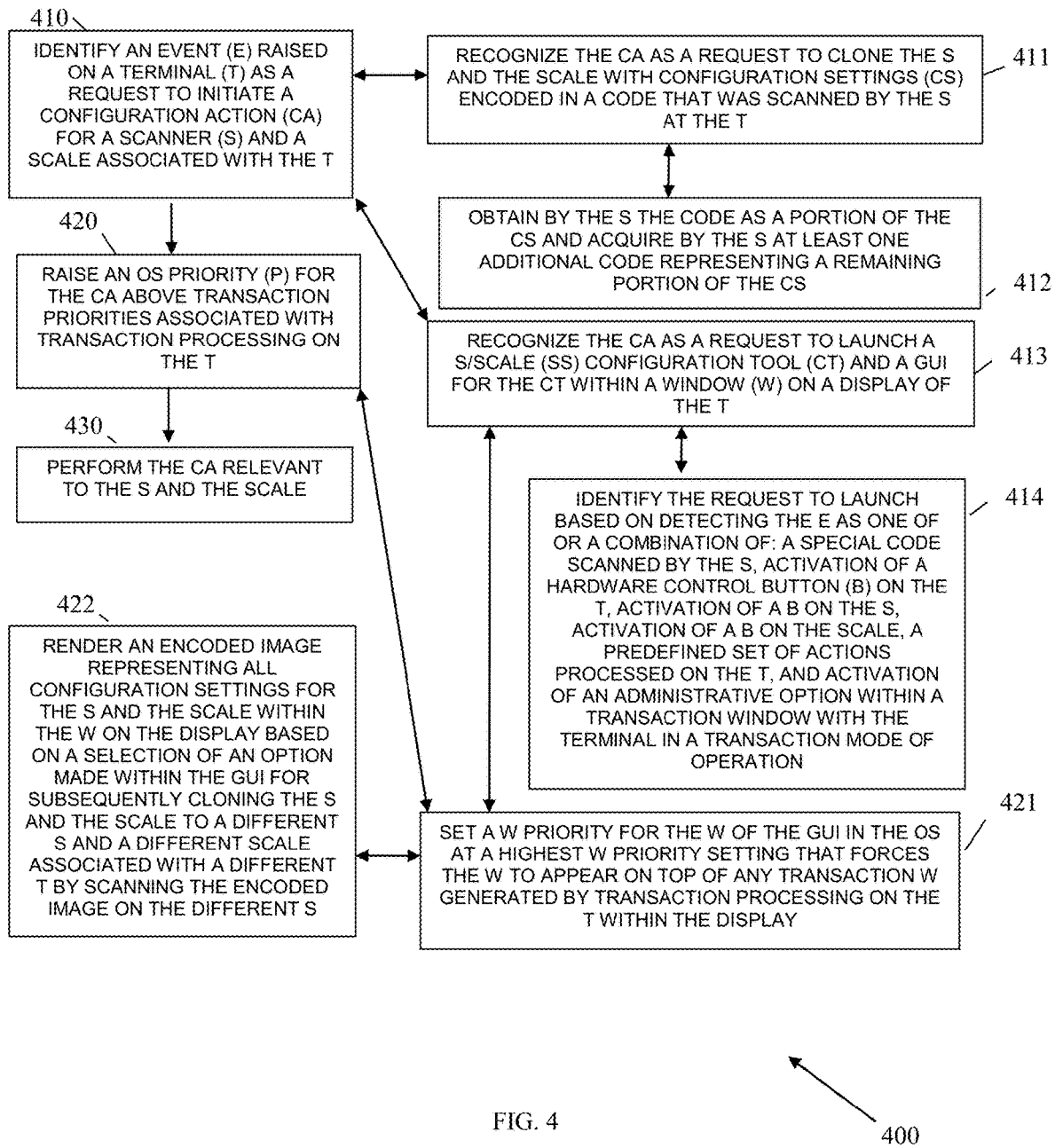
FIG. 4 is a diagram of another method for self-contained scanner configuration, according to an example embodiment.

FIG. 4 is a diagram of a method 400 for self-contained configuration of a scanner/scale, according to an example embodiment. The method 500 is implemented as executable instructions as a collection of software modules referred to collectively as a "scanner/scale configuration controller." The executable instructions reside in a non-transitory computer-readable storage medium and are executed from the non-transitory computer-readable storage medium by one or more processors of a transaction terminal. The transaction terminal has access to one or more networks during execution of the scanner/scale configuration controller by the processor. The networks can be wired, wireless, or a combination of both wired and wireless.

In an embodiment, the transaction terminal that executes the scanner/scale configuration controller is a combined integrated POS, scanner, and scale terminal represented by the motherboard 110 of the FIG. 1. In an embodiment, the transaction terminal is operated as a cashier assisted terminal for customer transactions. In an embodiment, the transaction terminal is operates as a SST by the customers that check themselves out for transactions.

In an embodiment, the transaction terminal has a separate motherboard from that which is associated with the scanner/scale. The scanner/scale is interfaced to the motherboard of the transaction terminal through USB or RS232 cabling.

In an embodiment, the scanner/scale configuration controller is one of, a combination of, or all of: the scanner platform software 111, the tool 112, the OPOS service object 114, and/or the method 300.

In an embodiment, the scanner/scale configuration controller presents another and in some ways processing perspective to the method 300 of the FIG. 3.

At 410, the scanner/scale configuration controller identifies an even raised on the terminal as a request to initiate a configuration action for a scanner and a scale associated with the terminal.

In an embodiment, at 411, the scanner/scale configuration controller recognizes the configuration action as a request to clone the scanner and the scale with configuration settings encoded in a code (such as the gold configuration barcode) that was scanned by the scanner at the terminal and identified as the gold configuration barcode by the barcode engine of the scanner/scale platform software 111.

In an embodiment of 411 and at 412, the scanner obtains the code as a first portion of the configuration settings and the scanner/scale configuration controller acquires through the scanner at least one additional code that represents a remaining portion of the configuration settings.

In an embodiment, at 413, the scanner/scale configuration controller recognizes the configuration action as a request to launch a scanner/scale configuration tool 112 and a GUI for the configuration tool 112 within a window rendered on a display of the terminal.

In an embodiment of 413 and at 414, the scanner/scale configuration controller identifies the request to launch based on detecting the event as one of or a combination of: a special code scanned by the scanner, activation of a hardware control button on the terminal, activation of a button on the scanner, activation of a button on the scale, a predefined set of actions processed on the terminal, and activation on an administrative option within a transaction window with terminal in a transaction mode of operation.

At 420, the scanner/scale configuration controller raises an OS priority for the configuration action above transaction priorities associated with transaction processing on the terminal.

In an embodiment of 413 and 420, at 421, the scanner/scale configuration controller sets a window priority for the window of the GUI in the OS at a highest window priority setting that forces the window for the GUI to appear on top of any transaction windows generated by transaction processing on the transaction within the display.

In an embodiment of 421 and at 422, the scanner/scale configuration controller renders an encoded image representing all configuration settings for the scanner and the scale (the gold configuration barcode) within the window on the display based on a selection of an option (such as 222 above in the FIG. 2) made within the GUI for purposes of subsequently cloning the scanner and the scale to a different scanner and a different sale associated with a different terminal by scanning the encoded image (gold configuration barcode) on the different scanner.

At 430, the scanner/scale configuration controller performs the configuration action relevant to the scanner and the scale utilized the raised priority within the OS (occurring at 420).

Figure 5:
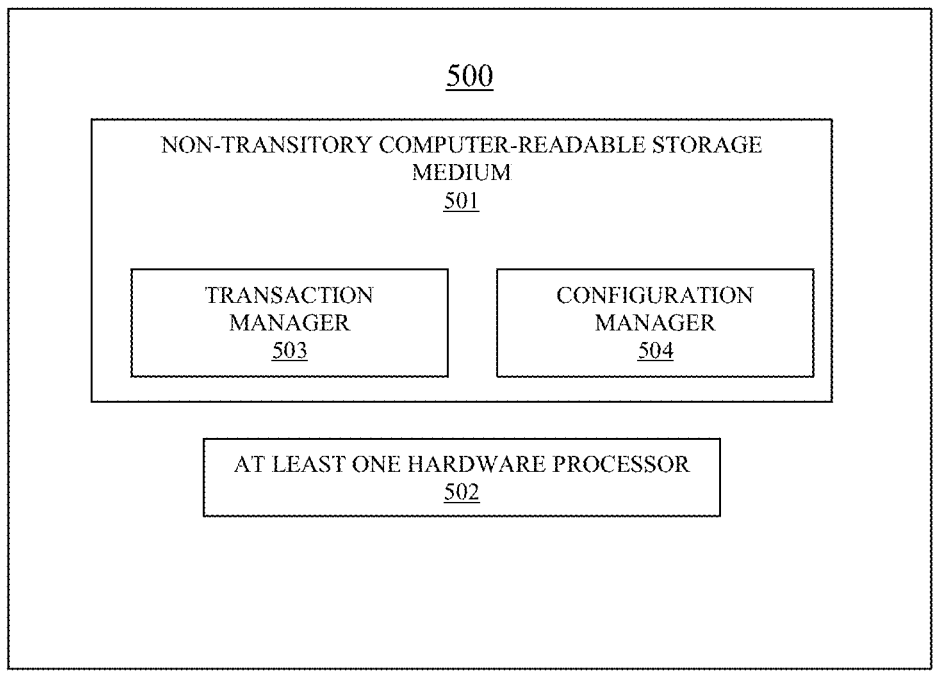
FIG. 5 is a diagram of a terminal for self-contained scanner configuration, according to an example embodiment.

FIG. 5 is a diagram of a terminal 500 for self-contained configuration of a scanner/scale, according to an example embodiment. The terminal 500 includes a variety of hardware components and software components. The software components of the terminal 500 are programmed and reside within memory and/or a non-transitory computer-readable medium and execute on one or more processors of the terminal 500. The terminal during operation has access to one or more networks, which can be wired, wireless, or a combination of wired and wireless.

The terminal 500 implements, inter alia, the processing described above with respect to the FIGS. 1-4.

The terminal 500 includes a non-transitory computer-readable storage medium 501 having executable instructions representing a transaction manager 503 and a configuration manager 504. The terminal 500 also includes at least one hardware processor 502.

The processor 502 is configured to execute the executable instructions of the transaction manager 503 and the configuration manager 504 from the non-transitory computer-readable storage medium 501.

When the transaction manager 503 is executed, the transaction manager 503 is configured to perform processing to: generate transaction windows rendered on a display connected to the terminal 500; and process a transaction being conducted at the terminal 500.

When the configuration manager 504 is executed, the configuration manager 504 is configured to perform processing to: 1) recognize an event as a configuration action for an integrated scanner/scale of the terminal 500; 2) set an OS priority for the configuration action above the transaction manager 503; and 3) processing the configuration action at the OS priority.

In an embodiment, the configuration manager 504 is all of or some combination of: the scanner platform software 111, the tool 112, the OPOS service object 114, the method 200, and/or the method 300.

In an embodiment, the terminal 500 is a POS terminal operated in cashier-assisted mode for checkout transactions or a POS terminal operated in self-service mode for customers self-checking themselves out for the transactions.

In an embodiment, the transaction manager 503 is the POS application software 113.

In an embodiment, the integrated scanner/scale are on a same motherboard 110 as the at least one processor 502 that executes the transaction manager 503.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    logging, by a processor of a motherboard, a user into a scanner support website that determines custom security settings for the user to perform configuration on a scanner, wherein scanner support website renders a code having the customer security settings on a display of a terminal for capturing the code as a code image by a mobile device operated by the user;
    receiving, by a processor of a motherboard, the code that is scanned into the scanner from a mobile display of the mobile device presenting the code image, wherein the motherboard comprises the scanner, a scale, and the terminal, and the motherboard is configured as a composite device that performs operations for three independent and integrated devices of the scanner, the terminal, and a scale, wherein the scanner and the scale further representing an integrated scanner/scale, wherein the terminal is a casher-assisted Point-Of-Sale (POS) terminal;
    identifying, by the processor of the motherboard, the code as a request to initiate a scanner/scale configuration tool by a barcode engine of the scanner that is always resident within memory of and processing on the motherboard when the motherboard is powered on;
    obtaining, by the processor of the motherboard, the custom security settings from the code for the user who provided the code for scanning via the mobile display of the mobile device to the scanner;
    initiating, by the processor of the motherboard, the scanner/scale configuration tool on the terminal with the custom security settings;
    rendering, by the scanner/scale configuration tool, a Graphical User Interface (GUI) within a window on the display of the terminal for configuring the integrated scanner/scale, wherein rendering further includes greying out options that are unavailable to the user based on the custom security settings, wherein rendering further includes projecting the window as an always-on-top GUI window that is over other windows presented on the display of the terminal;
    processing, by the processor of the motherboard, the GUI on the terminal at a higher priority level within an Operating System (OS) of the terminal than application software;
    performing, by the processor of the motherboard, a configuration action responsive to input received through the GUI on the scanner; and
    processing the method as a replacement to existing configuration actions associated with scanning and processing legacy codes during configuration of the integrated scanner/scale of the motherboard.

2. The method of claim 1, wherein rendering further includes setting a window priority for the window above a transaction priority associated with transaction windows rendered during transaction processing on the terminal.

3. The method of claim 1 further comprising, receiving by the processor of the motherboard, a set configuration image request from a selection of an option made within the GUI.

4. The method of claim 3, wherein receiving the set configuration image request further includes encoding, by the scanner/scale configuration tool, configuration settings for the scanner and the scale of the integrated scanner/scale as a second code based on the selection of the option.

5. The method of claim 4, wherein encoding further includes rendering, by the scanner/scale configuration tool, the second code as an image within the window for capturing by a camera of a mobile device.

6. The method of claim 1 further comprising:
    receiving, by the processor of the motherboard, a second code that is scanned by the scanner at the terminal;
    identifying, by the processor of the motherboard, the second code as a cloning request to clone configuration settings of a source scanner/scale on the integrated scanner/scale of the terminal; and
    changing, by the processor of the motherboard, existing configuration settings for the integrated scanner/scale to the configuration for cloning the source scanner/scale on the integrated scanner/scale.

7. The method of claim 1 further comprising, rendering, by the processor of the motherboard, on the display a second code encoded with configuration settings for the scanner and the scale of the integrated scanner/scale during a startup sequence for the terminal of the motherboard.

* * * * *